(12) United States Patent
Veshchikov et al.

(10) Patent No.: US 11,808,779 B2
(45) Date of Patent: Nov. 7, 2023

(54) METHOD FOR IDENTIFYING AN OBJECT HAVING A REPLACEABLE ACCESSARY AND AN OBJECT THEREFOR

(71) Applicant: NXP B.V., Eindhoven (NL)

(72) Inventors: Nikita Veshchikov, Brussels (BE); Arnold Braine, Overijse (BE)

(73) Assignee: NXP B.V., Eindhoven (NL)

( * ) Notice: Subject to any disclaimer, the term of this patent is extended or adjusted under 35 U.S.C. 154(b) by 238 days.

(21) Appl. No.: 17/305,427

(22) Filed: Jul. 7, 2021

(65) Prior Publication Data

US 2023/0010787 A1 Jan. 12, 2023

(51) Int. Cl.
| | |
|---|---|
| *G01H 1/14* | (2006.01) |
| *G01H 11/08* | (2006.01) |
| *G01H 17/00* | (2006.01) |
| *G01P 15/093* | (2006.01) |
| *G01P 15/097* | (2006.01) |

(Continued)

(52) U.S. Cl.
CPC .............. *G01P 15/097* (2013.01); *G01H 1/14* (2013.01); *G01H 11/08* (2013.01); *G01H 17/00* (2013.01); *G01L 5/042* (2013.01); *G01P 15/093* (2013.01); *G06F 18/00* (2023.01); *G06F 2218/12* (2023.01)

(58) Field of Classification Search
CPC .... G01P 15/097; G01P 15/0891; G01P 1/127; G01P 13/00; G01P 7/00; G01P 15/14; G01P 3/66; G01P 15/08; G01H 13/00; G01H 1/14; G01H 11/08; G01H 11/06; G01H 3/00; G01H 17/00; G01M 7/025; G01M 7/00; G01M 13/028; G01M 13/045; G01M 15/12; G01N 29/12; G06F 17/40

USPC ............ 73/514.29, 579, 587, 652, 658–659, 73/861.18; 700/74, 188, 280; 702/1, 702/33–35, 41, 54–56, 76, 127, 141, 702/183–185, 187–189

See application file for complete search history.

(56) References Cited

U.S. PATENT DOCUMENTS

| | | |
|---|---|---|
| 7,409,738 B2 | 8/2008 | Borras et al. |
| 7,712,365 B1 | 5/2010 | James |
| | (Continued) | |

FOREIGN PATENT DOCUMENTS

| | | |
|---|---|---|
| CN | 2788209 Y | 6/2006 |
| CN | 105866250 A | 8/2016 |
| | (Continued) | |

*Primary Examiner* — Jeffrey P Aiello
(74) *Attorney, Agent, or Firm* — Daniel D. Hill (57) ABSTRACT

A method is provided for identifying or authenticating an object. The method includes vibrating the object at a plurality of frequencies. The vibrations from the object are sensed at each of the plurality of frequencies using an accelerometer. A vibration profile of the object is generated using the sensed vibrations. The generated vibration profile is then compared to a stored vibration profile. It is determined if the generated vibration profile matches the stored vibration profile. A match indicates that the object has been identified or authenticated. In another embodiment, an object capable of implementing the method is provided. In another embodiment, the object may include a replaceable accessary. In this case, the initial and generated vibration profiles may be created with the replacement accessary attached to the object. A match of the generated and initial vibration profiles indicates that the replaceable accessary is authentic.

18 Claims, 3 Drawing Sheets

(51) Int. Cl.
　　　*G01L 5/04*　　　(2006.01)
　　　*G06F 18/00*　　　(2023.01)

(56) References Cited

U.S. PATENT DOCUMENTS

| | | | |
|---|---|---|---|
| 8,165,964 | B2 | 4/2012 | Oertel |
| 9,791,310 | B2 | 10/2017 | Girardeau |
| 2007/0102504 | A1 | 5/2007 | Cohen |
| 2007/0291988 | A1 | 12/2007 | Karimov et al. |
| 2018/0247036 | A1* | 8/2018 | Vincent ............... H04W 12/065 |
| 2019/0203729 | A1* | 7/2019 | Nishimura .......... F04D 15/0066 |
| 2019/0339687 | A1* | 11/2019 | Cella ................. G05B 19/41845 |
| 2020/0133257 | A1* | 4/2020 | Cella ................... G05B 19/4183 |
| 2021/0035388 | A1* | 2/2021 | Wu ........................... G06N 3/08 |

FOREIGN PATENT DOCUMENTS

| | | | | |
|---|---|---|---|---|
| CN | 108680246 | A | | 10/2018 |
| CN | 113302467 | A * | 8/2021 | ............ G01M 13/00 |
| EP | 1468258 | B1 | | 10/2004 |

\* cited by examiner

METHOD FOR IDENTIFYING AN OBJECT HAVING A REPLACEABLE ACCESSARY AND AN OBJECT THEREFOR

BACKGROUND

Field

This disclosure relates generally to data processing, and more specifically, to a method for identifying an object having a replaceable accessary and an object therefor.

Related Art

There are many ways to provide object identification and authentication. In some cases, it may be necessary to distinguish a specific object from a group of objects. In other cases, it may be necessary to distinguish between groups of objects, e.g. counterfeit spare parts versus original spare parts. Some inexpensive or deposable objects may be commonly copied and require some basic form of counterfeit detection. One relatively straight forward way for a manufacturer to avoid counterfeits is to embed a microchip in each product. The microchip may contain cryptographic material (keys) which are used to identify or authenticate an item. However, for some products, embedding a microcontroller in the products may significantly increase cost of the products. That is, the increased cost may include the extra cost of the microcontroller, and extra manufacturing cost for each item. This may make the products too expensive to be competitive and benefit counterfeiters. Thus, other ways of identifying, authenticating, and distinguishing counterfeit items are preferred in such scenarios. Moreover, in case of some small spare parts there may not be enough space for a microcontroller to be embedded in the item or there may be functional, geographic, or safety requirements related to the weight, density or the type of materials in the item. The requirements may make it impractical to embed a microcontroller in the item.

Therefore, what is needed is a way to provide an identification mechanism for small relatively inexpensive objects, such as for example, replaceable accessories for a larger object or device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for identifying or authenticating an object in accordance with an embodiment. During manufacturing, the object is vibrated at a plurality of frequencies. In one embodiment, the object may be vibrated by running a motor in or attached to the object at various speeds. Vibrations from the motor are sensed at each of the plurality of frequencies (or motor speeds) using an accelerometer. A vibration profile of the object is generated using the sensed vibrations. The generated vibration profile is compared to a stored vibration profile to determine if the generated vibration profile matches the stored vibration profile. The vibration profile may include a plurality of motor speeds and corresponding accelerometer output voltages. A match indicates a positive identification or authentication of the object. If the generated vibration profile does not match the stored vibration profile, then the identification or authentication fails. In another embodiment, an object is provided having a replaceable accessary. The method is performed on the object with the replaceable accessary attached. In this case, a match may indicate that the replaceable accessary is authentic. If the vibration profiles do not match, the replaceable accessary may not be authentic, indicating a possible counterfeit replaceable accessary.

The method provides a relatively cost-effective way to identify or authenticate an object that has relatively inexpensive replaceable accessories.

In accordance with an embodiment, there is provided, a method for identifying or authenticating an object, the method including: vibrating the object at a plurality of frequencies; sensing vibrations from the object at each of the plurality of frequencies using an accelerometer; generating a vibration profile of the object using the sensed vibrations; comparing the generated vibration profile to a stored vibration profile; and determining if the generated vibration profile matches the stored vibration profile. The object may include a motor for generating the vibrations, and wherein vibrating the object at a plurality of frequencies may further include selecting a plurality of speeds of the motor. The accelerometer may be a multi-axis accelerometer. Generating a vibration profile of the object may further include generating a plurality of accelerometer output voltages, one of the plurality of accelerometer output voltages corresponding to each of the plurality of frequencies. Determining if the generated vibration profile matches the stored vibration profile may further include determining that one of the plurality of accelerometer output voltages matches a stored output voltage of the stored vibration profile. The stored vibration profile may be generated when the object is manufactured. Sensing vibrations from the object at the plurality of frequencies using an accelerometer may further include sensing vibrations from the object using more than one accelerometer. The method may further include determining that the object is identified or authenticated when the generated vibration profile matches the stored vibration profile. Vibrating the object at a plurality of frequencies may further include vibrating the object with a replaceable accessary attached at the plurality of frequencies.

In another embodiment, there is provided, a method for identifying or authenticating an object, the object having a replaceable accessary, the method including: vibrating the object with the replaceable accessary attached at a plurality of frequencies during manufacturing of the object; sensing vibrations from the object at each of the plurality of frequencies using one or more accelerometers; generating a first vibration profile from output signals of the one or more accelerometers at each of the plurality of frequencies; storing the first vibration profile in a memory of the object; replacing the replaceable accessary of the object with a replacement accessary after manufacturing the object; measuring the vibrations from the object with the replacement accessary at each frequency of the plurality of frequencies; generating a second vibration profile of the object with the replacement accessary using the measured vibrations after the manufacturing of the object; comparing the second vibration profile to first vibration profile; and determining if the second vibration profile matches the first vibration profile; and identifying or authenticating the object with the replacement accessary when the second vibration profile matches the first vibration profile. The object may include a motor for generating the vibrations, and wherein vibrating the object with the replacement accessary at a plurality of frequencies may further include selecting a plurality of speeds of the motor. The one or more accelerometers may be one of more of a ceramic piezoelectric sensor, a variable capacitance MEMS (micro-electromechanical system), a piezoresistive accelerometer, or a proximity probe. Generating the first vibration profile from output signals of the one or more accelerometers at each of the plurality of frequencies may further include generating the first vibration profile from output voltages of the one or more accelerometers. The one or more accelerometers may be one or more multi-axis accelerometers. Comparing the second vibration profile to the first vibration profile may further include using a machine learning algorithm to perform the comparison and provide a confidence that the second vibration profile matches the first vibration profile.

In yet another embodiment, there is provided, an object including: a main housing having a replaceable accessary attachable thereto, the main housing comprising: a motor; a processor coupled to the motor for controlling a speed of the motor; an accelerometer mounted to the object for sensing vibrations from the motor and for providing an output signal corresponding to the speed of the motor; and a memory coupled to the processor and to the accelerometer for storing a first vibration profile created during manufacturing of the object with a first replaceable accessary, wherein the stored first vibration profile includes a plurality of output signals from the accelerometer, each of the plurality of output signals corresponding to a different motor speed of a first plurality of motor speeds, wherein a second vibration profile is generated for the object with a second replaceable accessary after the manufacturing of the object, the second vibration profile comprising a second plurality of output signals of the accelerometer, each of the second plurality of output signals corresponding to a different motor speed of a second plurality of motor speeds, wherein the second vibration profile is compared with the first vibration profile to determine if the second replaceable accessary is substantially the same as the first replaceable accessary. The one or more accelerometers may be one or more multi-axis accelerometers. The object may further include a machine learning model to perform the comparison and provide a confidence that second vibration profile matches the first vibration profile. The one or more accelerometers may be one of more of a ceramic piezoelectric sensor, a variable capacitance MEMS (micro-electromechanical system), a piezoresistive accelerometer, or a proximity probe. The first and second pluralities of output signals may be first and second pluralities of output voltages.

Figure 1:
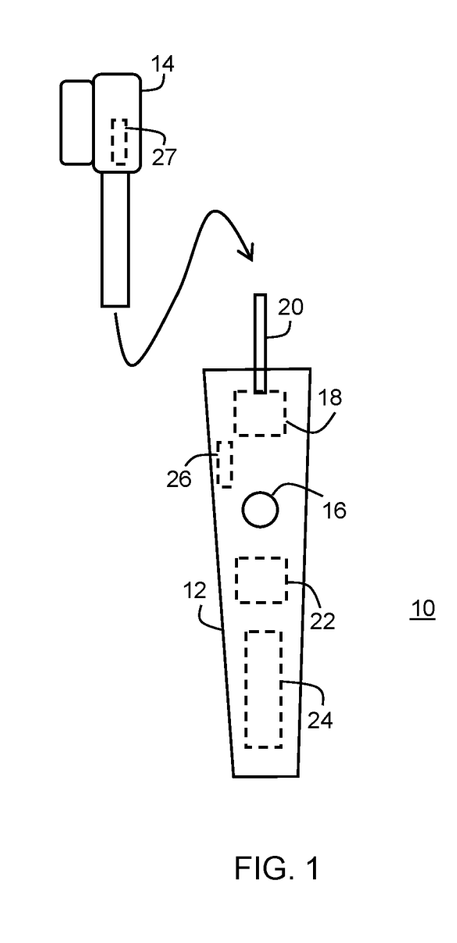
FIG. 1 illustrates an object having a replaceable accessary in accordance with an embodiment.

The object, or device, may be any kind of object. In one embodiment, the object may be an electric or electronic consumer product. The object may include a source of vibration. A running motor vibrates and can be a source of vibration in accordance with an embodiment. If a motor with a constant power and speed of rotation is attached to different objects, the objects will produce different patterns of vibrations when the motor is turned on. Moreover, if the speed of the motor is changed, different objects will respond differently to such change. In one example, the object may be an electric toothbrush as illustrated in FIG. 1 and described below. Electric toothbrushes, like many products, already have a motor that is installed specifically for the purpose of vibrating a replaceable toothbrush head. The motor may be configured to run at multiple speeds. Thus, only an accelerometer and controller need to be installed in the body or housing of the toothbrush plus software or firmware to run on the controller to enable the system to function. Other examples of objects that already have motors or other sources of vibration installed include a printer, an electric razor, and a smartphone.

If subjected to the same force, different objects will vibrate with different speed, frequency, amplitude, and patterns. These different vibrations are due to various properties of the objects and the materials the objects are made from. For example, size, weight, shape, aerodynamics, stiffness (rigidity), distribution of weight across the object (different densities of materials in different parts of the object), presence of moving parts, etc.

FIG. 1 illustrates an electric toothbrush 10 having a replaceable toothbrush head 14 in accordance with an embodiment. As mentioned above, electric toothbrush 10 is just one example of an object having a replaceable accessary. In other embodiments, the object may be a different type of product. Electric toothbrush 10 includes main housing 12 and replaceable toothbrush head 14. Main housing 12, which also serves as a handle, includes power switch 16, motor 18, motor shaft 20, controller 22, battery 24, and accelerometer 26. Note that the dashed lines indicate that motor 18, controller 22, battery 24, and accelerometer 26 are internal to main housing 12. In one embodiment, each replaceable toothbrush head 14 includes accelerometer 27. Accelerometer 27 may be embedded within the material used to form replaceable toothbrush head 14. Use of accelerometer 27 in replaceable toothbrush head 14 may require an electrical connection between replaceable toothbrush head 14 and main housing 12, thus increasing cost of the replaceable toothbrush head 14. In another embodiment, only one accelerometer, such as accelerometer 26, is included. Accelerometer 26 may be installed and attached somewhere in main housing 12 as illustrated. In one embodiment, accelerometer 26 is attached directly to motor 18. In other embodiments, object 10 may include more than one accelerometer. The accelerometer(s) can be any type of accelerometers, such as a ceramic piezoelectric sensor, a variable capacitance MEMS (micro-electromechanical system), a piezoresistive accelerometer, or a proximity probe. In one embodiment, the accelerometer may be a multi-axis accelerometer for sensing vibration in more than one axis or direction.

Figure 2:
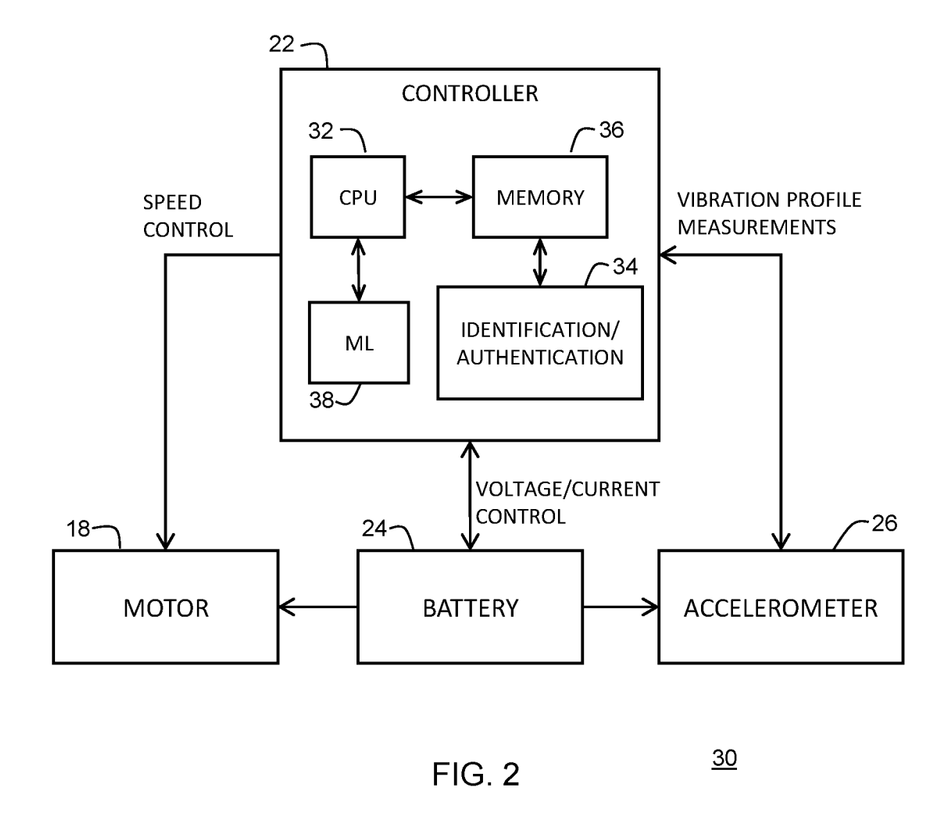
FIG. 2 illustrates the controller of FIG. 1 in more detail in accordance with an embodiment.

Main power switch 16 is used to turn the power on and off to the electrical components of electric toothbrush 10. The power may be provided by battery 24 or from another power source. Additionally, in some embodiments, main power switch 16 may include multiple switch positions for controlling the motor speed. In another embodiment, a separate motor speed switch may be provided (not shown). Motor shaft 20 extends from motor 18 and serves as the attachment point for replaceable toothbrush head 14. Controller 22 is positioned in main housing 12 and provides electronic circuitry to control the functions of electric toothbrush 10, such as motor speed control, identification and/or authentication, and creating a stored vibration profile. An embodiment of controller 22 is illustrated in FIG. 2 and described below.

In one embodiment, an initial vibration profile is generated and stored in a memory of electric toothbrush 10. The initial vibration profile may be created by running motor 18 at various speeds and storing an output voltage of accelerometer 26 and/or accelerometer 27 in a memory. When subjected to a vibration, an accelerometer provides an output voltage, where a voltage level of the output voltage corresponds to the frequency of the vibration. As used herein, the term vibration profile is used to describe a list or table of entries (not shown) to describe a vibration or shaking pattern of an object given some input vibration. The list or table may include, for example, a plurality of motor speeds and corresponding accelerometer output voltages. The vibration profile may reflect how an object moves in space when subject to vibrations at a plurality of frequencies. The input vibration may be provided by, for example, a motor in the object. The initial vibration profile is generated for the object with a replaceable accessary attached. The sensed vibrations and corresponding output voltages from the accelerometers may be stored in a memory of the object. When the use of counterfeited replacement parts or accessories is the concern, the initial vibration profile may be constructed with an original or authorized replacement accessary. Depending on the embodiment, the initial vibration profile may be stored in a memory of the object by the manufacturer during manufacturing, a distributor of the object, or by the user/consumer during a first use of the object.

In another embodiment, another initial vibration profile may be generated without the replaceable accessary attached. Then, if a generated vibration profile matches the initial vibration profile that was created without the replaceable accessary, an alert may be provided that the object is being operated without the replaceable accessary. This may also trigger another action that causes the object to shut down or enter a special mode to avoid damage to the object or potential injury to the user.

After the initial vibration profile is stored, and the object is being used in the field, additional vibration profiles maybe generated. The additional vibration profiles are compared with the initial stored vibration profile. If the object includes a replaceable accessary that is substantially the same as an original replaceable accessary, the additional profile should substantially match the stored initial vibration profile, so that the object is identified or authenticated as having an authorized or authentic replaceable accessary. If the replaceable accessary is replaced with a replaceable accessary that is different in some aspect, such as weight, size, or shape, the acquired vibration profile will be different and the additional profile will not match the initial stored profile, indicating that the attached replaceable accessary may be a counterfeit part or otherwise unauthorized.

Generally, the replaceable accessories are "wear items" that may only have a limited useful life before wearing out and needing replacement. For a number of the same or similar objects, each acquired vibration profile may be a little different due to wear, small variations in manufacturing, as well as in small measurement errors. Thus, the comparison between the stored and the acquired vibration profiles should take the variations into account. The comparison of profiles may be done in a variety of different ways including using machine learning (ML) or a distance measurement between the acquired profile and the stored profile. When using a ML model, the ML model may also provide a confidence value that the comparison is correct.

Depending on the application, it may be advantageous to use this system for identifying inexpensive specific spare parts, identifying spare parts from a specific manufacturer, distinguishing counterfeit from original or authorized parts, or distinguishing faulty or badly manufactured parts from good parts.

It is possible to have more precise measurements and better identification by using multiple accelerometers distributed across the device relatively far apart from each other. Similarly, better results may be produced by using several motors that can be controlled separately. Also, careful placement of the accelerometers relative to the source of vibration may provide better results. It is also possible to improve the quality and precision of the vibration profiles by using multiple motor speeds when acquiring measurements from the accelerometer because it will give more data when comparing the profiles. This may be helpful when the condition of the battery is suspect.

The vibration profile of an object may change depending on the object's orientation in space. Thus, for some applications better results may be provided if the object is positioned in a specific way every time a measurement is taken. For example, the object may be positioned on a special pad, table, or other type of support. In some cases, several vibration profiles may be generated with the object in different positions.

FIG. 2 illustrates controller 22 in more detail in accordance with an embodiment. In one embodiment, controller 22 includes central processing unit (CPU) 32, memory 36, identification/authentication circuit 34, and ML model 38. Controller 22 may be implemented as one or more integrated circuits. Also, illustrated in FIG. 2 is motor 18, battery 24, and accelerometer 26. Battery 24 supplies power to motor 18, controller 22, and accelerometer 26. Controller 22 is coupled to provide a speed control signal (SPEED CONTROL) to motor 18. The speed control signal SPEED CONTROL may be used during normal operation of electric toothbrush 10 to set the operating speed or may be used to generate vibration profiles. Controller 22 is coupled to receive an output signal from accelerometer 26. The output signal may be an output voltage that is proportional to a sensed vibration level from accelerometer 26.

Central processing unit 32 may include any hardware data processing device capable of executing instructions stored in memory 36. For example, CPU 32 may execute applications related to functionality provided by electric toothbrush 10 as described herein. Also, CPU 32 orchestrates the identification/authentication process. Central processing unit 32 may be, for example, a microprocessor, field programmable gate array (FPGA), application-specific integrated circuit (ASIC), or similar device. Central processing unit 32 may include multiple processor cores. Also, in some embodiments having a security requirement, CPU 32 may be implemented in a secure hardware element and may be tamper resistant.

Memory 36 may be any kind of memory, such as for example, L1, L2, or L3 cache or system memory. Memory 36 may include one or more of a volatile memory such as static random-access memory (SRAM) or dynamic RAM (DRAM), or may include one or more of a non-volatile memory such as flash memory, read only memory (ROM), or other volatile or non-volatile memory. Also, memory 36 may be implemented in a secure hardware element with or separate from CPU 32. In one embodiment memory 36 may store data and/or instructions upon which CPU 32 may operate. Also, memory 36 may store the one or more initial vibration profiles generated for use in the described embodiments. In addition, memory 36 may be used to store weight matrices for the ML model 38. Memory 36 may also store, for example, program code for implementing at least of portion of the functionality of a method of identifying or authenticating the combination of electric toothbrush 10 with replaceable toothbrush head 12.

Identification/authentication circuit 34 provides an indication in response to the comparison between the stored initial vibration profile and the computed vibration profile. In case of the correct identification/authentication of the replaceable accessories or spare parts for an object, normal operation of the object is allowed to proceed. In case of a failed identification/authentication, actions may include (1) a second comparison to make sure that there was not errors in the first comparison, (2) an alert using one or more of, for example, a sound, flashing light emitting diodes (LEDs), or to question whether operation should continue, (3) the toothbrush shutting down, rebooting, or disabling certain functions. Identification/authentication circuit 34 may be implemented in hardware, software, or a combination of hardware and software.

Controller 22 is bi-directionally connected to battery 24 and is configured to control the voltage and/or current provided by battery 24. This may help to generate more accurate vibration profiles. Also, the precision of the identification or authentication may be improved by having extra information from the battery. Controller 22 may include functionality to analyze the condition of battery 24. For example, if the battery is partially discharged, the battery may provide relatively less current compared to a fully charged battery. The lower battery charge can reduce the speed of the motor for a given speed control setting and thus the frequency at which the motor vibrates. Therefore, the vibration profile might not be acquired at the correct frequency. Additional vibration profiles may be used if the battery is producing less current to the motor, or the battery's output may be considered during the comparison of the vibration profiles as a parameter.

Machine learning model 38 may be used to perform the comparison of the vibration profiles. Additionally, ML model 38 may provide a confidence that a generated vibration profile matches the initial vibration profile. The confidence may be provided in the form of a percentage chance that the comparison is correct.

Figure 3:
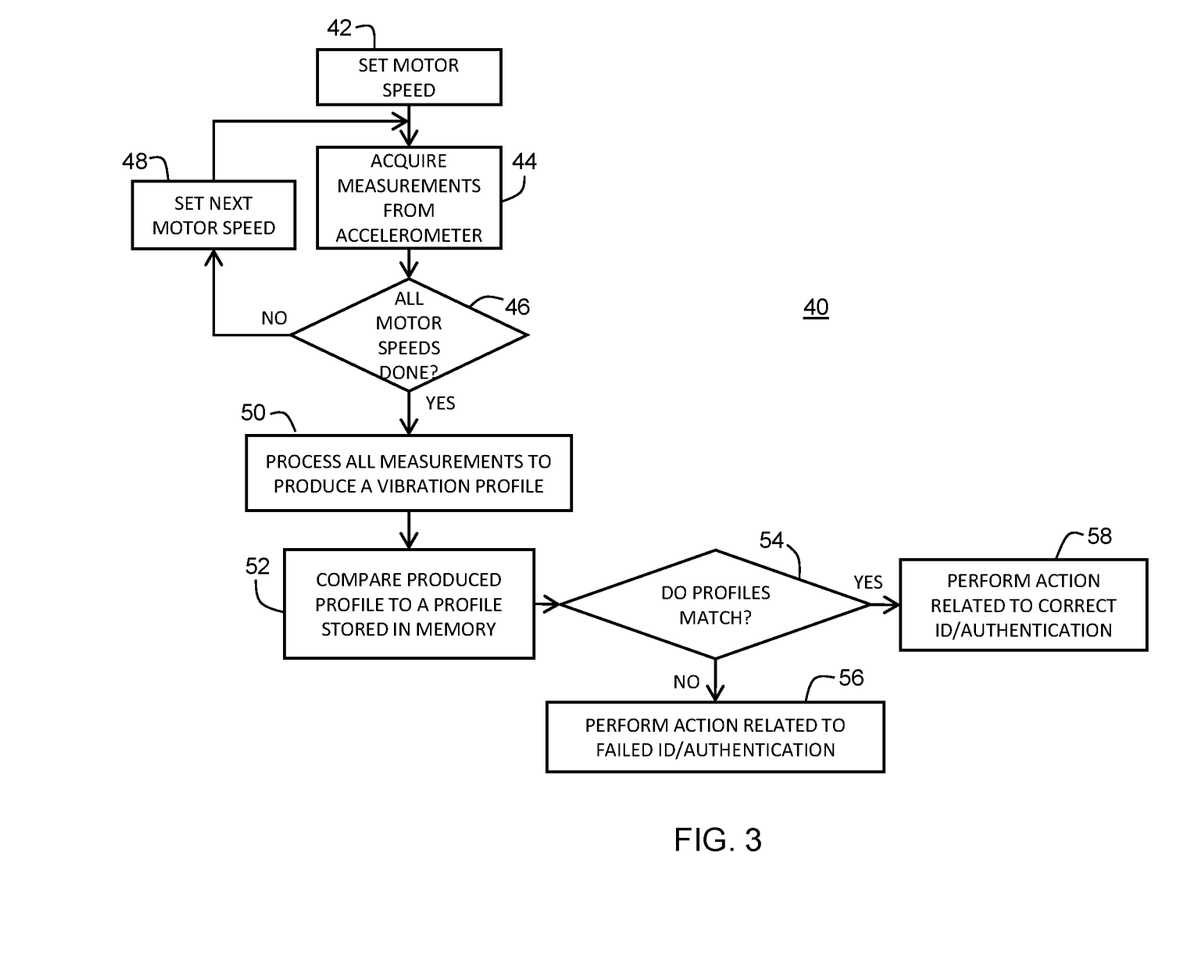
FIG. 3 illustrates a method for identifying and/or authenticating an object in accordance with an embodiment.

FIG. 3 illustrates a method 40 for identifying or authenticating an object in accordance with an embodiment. Method 40 provides the ability to identify a replaceable accessary or replacement part using a vibration profile. Method 40 is executed by controller 22. A similar method may be used to initialize the object by generating and storing an initial vibration profile. Method 40 begins at step 42. At step 42, a motor speed is set in the object of interest, for example, electric toothbrush 10. At step 44, measurements are acquired from the accelerometer for the set motor speed. At decision step 46, it is determined if all motor speeds have been set. If all motor speeds have not been set, the "NO" path is taken to step 48, and the next motor speed is set and steps 44 and 46 are repeated. However, if all possible or desired motor speeds have been set, the "YES" path is taken to step 50. At step 50, all the acquired measurements are processed to produce a vibration profile. At step 52, the vibration profile produced at step 50 is compared to a vibration profile stored in a memory of the object, such as memory 36 in FIG. 2. At decision step 54, it is determined if the two profiles match. If the two profiles do not match sufficiently, the "NO" path is taken to step 56. To "match sufficiently" may mean to match within a predetermined threshold. At step 56, an action may be performed related to the failed identification/authentication. In case of a failure, a second comparison may be performed in case there were errors in the first comparison. Also, an alert may be provided. the alert may be, for example, a sound or a flashing light emitting diode (LED). In addition, the object may shut down, reboot, or disable some functions. However, if it is determined that the profiles do match sufficiently, the "YES" path is taken to step 58. At step 58, an action may be taken related to the correct identification/authentication. For example, the object may continue to function normally.

If one or more parameters of the replaceable accessory changes over time because of, for example, wear, the vibration profile may change, and the object may give a false negative indication. That is, the object may not be able to correctly identify or authenticate a correct replaceable part that is old and worn. There are at least two solutions to this issue: (a) update the vibration profile after each correct identification and thus update the vibration profile against which it is compared; (b) consider it as a feature and alert the user that a spare part is too old and needs to be replaced; (c) both solutions can be used together in that the device can have two vibration profiles stored in memory. There may be one vibration profile for original new parts that were installed by the manufacturer. There may be a second profile for the specific part that is in use. For the specific part, the acquired vibration profile should be compared against both stored vibration profiles each time and only the $2^{nd}$ profile should be updated. The user may be alerted if the two vibration profiles differ by a chosen threshold.

Also, there may be small differences in the vibration profile due to small uncontrollable, or difficult to control, variations in the manufacturing process. If a specific part needs to be identified, the variations may provide more differences in vibration profiles. To distinguish between counterfeit and original parts a larger margin of error may have to be accepted if there is more variability in the original parts.

In another embodiment, the object may be a printer and any printer spare parts and consumables such as ink cartridges. Printers already have motors that make the printing head and the ink cartridges move. The movements produce small but perceptible vibrations of different parts of the printer. An accelerometer can be installed to measure the movements and produce an initial vibration profile of the printer. Original parts such as ink cartridges should be used for the initial vibration profile. Because an ink cartridge is filled with a liquid, the weight of the ink cartridge will be significantly greater when the ink cartridge is full than when the ink cartridge is nearly empty. This variable will affect the measured vibration from the accelerometer. Therefore, it may be important to record vibrations when the installed ink cartridges are at a predetermined ink level, e.g., when the ink cartridge is full, to get repeatable and accurate measurements. In some printers, the ink level may be measurable by the printer and may be considered when comparing the vibration profiles.

Smartphones and other smart devices often require some minor repairs. A common problem is a broken or cracked screen or touch-surface. Another reason for repair is to replace the battery. Most users will not be able to check the quality or source of replacement parts that are installed in their phones. Moreover, they will not be able to check if some spare parts are still there or were replaced for cheaper equivalent ones. It is possible to use the integrated motors and accelerometer to check if the new screen (or other parts) are well attached or if lots of parts were replaced using the technique described herein. The user might record an initial vibration profile of the phone before the repairs and then generate another vibration profile after the repairs. Typically, a smartphone does not have any parts that are replaceable by a consumer or user. A vibration profile will likely be specific to just one particular smartphone. The method may also be used for a smartphone that is in a repair shop for only software repair. An owner of the smartphone may be able to use the described method to check if the phone was opened and if any parts were moved, replaced, added, or removed.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for identifying or authenticating an object, the method comprising:
   generating a first vibration profile of the object when the object has a known authorized replaceable accessory attached, the first vibration profile being generated at a plurality of frequencies, wherein the plurality of frequencies is provided by running a motor at a plurality of speeds and sensing resulting vibrations;
   storing the initial vibration profile in a memory of the object;
   vibrating the object at the plurality of frequencies by running the motor at the plurality of speeds when the object has another replaceable accessory attached;
   sensing vibrations from the object with the another replaceable accessory attached at each of the plurality of frequencies using an accelerometer;
   generating a second vibration profile of the object using the sensed vibrations;
   comparing the second vibration profile to the first vibration profile;
   determining if the second vibration profile matches the first vibration profile; and
   determining that the another replaceable accessory is counterfeit when the second vibration profile does not match the first vibration profile.

2. The method of claim 1, wherein the accelerometer is a multi-axis accelerometer.

3. The method of claim 1, wherein generating a second vibration profile of the object further comprises generating a plurality of accelerometer output voltages, one of the plurality of accelerometer output voltages corresponding to each of the plurality of frequencies.

4. The method of claim 3, wherein determining if the generated second vibration profile matches the first vibration profile further comprises determining that one of the plurality of accelerometer output voltages matches a stored output voltage of the stored vibration profile.

5. The method of claim 1, wherein the first vibration profile is generated when the object is manufactured.

6. The method of claim 1, wherein sensing vibrations from the object at the plurality of frequencies using an accelerometer further comprises sensing vibrations from the object using more than one accelerometer.

7. The method of claim 1, further comprising determining that the object is identified or authenticated when the second vibration profile matches the first vibration profile.

8. A method for identifying or authenticating an object, the object having a replaceable accessary, the method comprising:
   vibrating the object with the replaceable accessary attached at a plurality of frequencies during manufacturing of the object;
   sensing vibrations from the object at each of the plurality of frequencies using one or more accelerometers;
   generating a first vibration profile from output signals of the one or more accelerometers at each of the plurality of frequencies;
   storing the first vibration profile in a memory of the object;
   replacing the replaceable accessary of the object with a replacement accessary after manufacturing the object;
   measuring the vibrations from the object with the replacement accessary at each frequency of the plurality of frequencies;
   generating a second vibration profile of the object with the replacement accessary using the measured vibrations after the manufacturing of the object;
   comparing the second vibration profile to the first vibration profile;
   determining if the second vibration profile matches the first vibration profile;
   identifying or authenticating the object with the replacement accessary when the second vibration profile matches the first vibration profile; and
   determining that the replacement accessary is counterfeit when the second vibration profile does not match the first vibration profile.

9. The method of claim 8, wherein the object includes a motor for generating the vibrations, and wherein vibrating the object with the replacement accessary at a plurality of frequencies further comprises selecting a plurality of speeds of the motor.

10. The method of claim 8, wherein the one or more accelerometers is one of more of a ceramic piezoelectric sensor, a variable capacitance MEMS (micro-electromechanical system), a piezoresistive accelerometer, or a proximity probe.

11. The method of claim 8, wherein generating the first vibration profile from output signals of the one or more accelerometers at each of the plurality of frequencies further comprises generating the first vibration profile from output voltages of the one or more accelerometers.

12. The method of claim 8, wherein the one or more accelerometers is one or more multi-axis accelerometers.

13. The method of claim 8, wherein comparing the second vibration profile to the first vibration profile further comprises using a machine learning algorithm to perform the comparison and provide a confidence that the second vibration profile matches the first vibration profile.

14. An object comprising:
a main housing having a replaceable accessary attachable thereto, the main housing comprising:
  a motor;
  a processor coupled to the motor for controlling a speed of the motor;
  an accelerometer mounted to the object for sensing vibrations from the motor and for providing an output signal corresponding to the speed of the motor; and
  a memory coupled to the processor and to the accelerometer for storing a first vibration profile created during manufacturing of the object with a first replaceable accessary,
  wherein the stored first vibration profile comprises a plurality of output signals from the accelerometer, each of the plurality of output signals corresponding to a different motor speed of a first plurality of motor speeds, wherein a second vibration profile is generated for the object with a second replaceable accessary after the manufacturing of the object, the second vibration profile comprising a second plurality of output signals of the accelerometer, each of the second plurality of output signals corresponding to a different motor speed of a second plurality of motor speeds, wherein the second vibration profile is compared with the first vibration profile to determine if the second replaceable accessary is the same as the first replaceable accessary, and wherein if the second replaceable accessary is not the same as the first replaceable accessary, determining that the second replaceable accessary is counterfeit.

15. The object of claim 14, wherein the one or more accelerometers is one or more multi-axis accelerometers.

16. The object of claim 14, further comprising a machine learning model to perform the comparison and provide a confidence that the second vibration profile matches the first vibration profile.

17. The object of claim 14, wherein the one or more accelerometers is one of more of a ceramic piezoelectric sensor, a variable capacitance MEMS (micro-electromechanical system), a piezoresistive accelerometer, or a proximity probe.

18. The object of claim 14, wherein the first and second pluralities of output signals are first and second pluralities of output voltages.

* * * * *